United States Patent Office 3,173,956
Patented Mar. 16, 1965

3,173,956
PROCESS FOR MAKING SALICYLALDEHYDES
Robert R. Grinstead, Walnut Creek, Calif., assignor to The Dow Chemical Company, Midland, Mich., a corporation of Delaware
No Drawing. Filed Oct. 24, 1963, Ser. No. 318,497
5 Claims. (Cl. 260—600)

This invention relates to a new method for making salicylaldehydes by direct oxidation of a saligenin (o-hydroxybenzyl alcohol).

Salicylaldehyde itself is a valuable chemical intermediate which is usually made on a commercial scale by the Reimer-Tiemann process wherein phenol is reacted with chloroform and an alkali such as sodium hydroxide. This is an effective process, but it has a number of disadvantages, particularly the relatively low yield which is characteristic of the reaction. A considerable amount of work has developed a number of other processes for making salicylaldehyde, but none of these has proven to be sufficiently advantageous to supplant the older method. Among such alternative methods may be mentioned the chlorination and subsequent hydrolysis of o-cresyl esters, the oxidation of certain o-cresyl esters with manganese dioxide and sulfuric acid, and various even more indirect processes which are only of laboratory interest. It would be desirable, therefore, to have available more direct methods utilizing other starting materials for the preparation of salicylaldehyde. It is the principal object of this invention to provide such a method.

It has now been found that salicylaldehyde can be produced in good yields using moderate reaction conditions by a direct oxidation technique which comprises contacting saligenin in alkaline alkanoic solution with molecular oxygen at about 0–150° C. in the presence of a manganese chelate of a compound of the formula

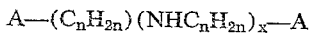

wherein $n$ is 2–3, $x$ is 0–2, and A is a radical selected from the group consisting of

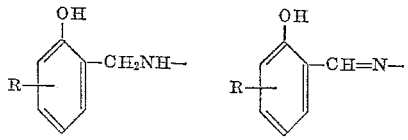

where R is hydrogen or lower alkyl. Manganous chelates of compounds such as

α,α'-(Ethylenediimino)di-o-cresol,
α,α'-(Ethylenedinitrilo)di-o-cresol,
α,α'-Iminobis(ethylenediimino)di-o-cresol,
α,α'-(Propylenediimino)di-o-cresol,
α,α'-Iminobis(propylenediimino)di-o-cresol,
α²,α²'-(Ethylenediimino)di-2,4-xylenol,
4,4-di-tert-butyl-α,α'-(ethylenedinitrilo)di-o-cresol, and similar di-o-cresols are suitable. Preferably, the chelating compound is α,α'-(ethylenediimino)di-o-cresol. A maganous salt is the most convenient source of manganese for the formation of the chelate. Salts which are easily dissolved in lower alkanols are most suitable, for example, $MnCl_2$, $Mn(NO_3)_2$, $MnSO_4$, manganous acetate, and the like.

The proportion of manganese chelate relative to the saligenin present is not critical for any quantity will work to some extent. However, best results are obtained when at least about 0.01 mole of chelate is present per mole of saligenin and preferably about 0.02–0.1 mole of chelate is used. Larger quantities may be used but give no better results. The manganese salt and the chelating compound or chelator are ordinarily employed in equal molar proportions to form the chelate. An excess of the salt or the chelator can be used but without substantial advantage.

The reaction is carried out in strongly alkaline solution in a lower alkanolic solvent. Suitable solvents are alkanols of one to about five carbon atoms which are capable of dissolving an appreciable amount of water. The alkanolic solvent may include up to about 50% by volume of water. Preferably, methanol or ethanol containing 0–35% by volume of water is used.

A strong base is required in the reaction mixture. By the term strong base is meant a base of sufficient alkalinity to form an aqueous solution at 25° C. in which it has a dissociation constant of at least $1 \times 10^{-4}$. Such bases are capable of reacting with a phenol to form the phenate and they include sodium hydroxide, sodium carbonate, potassium hydroxide, lithium hydroxide, calcium hydroxide, and barium hydroxide. The hydroxides and carbonates of the alkali metals and the hydroxides of the alkaline earth metals are, in general, most convenient to use and an alkali metal hydroxide, particularly sodium hydroxide, is most preferred.

About 0.5 to about 4 equivalent weights of alkali per mole of saligenin is the operable range and about 1–2 equivalents of alkali gives the best results.

The oxidation process is operable at any temperature between about 0° C. and about 150° C. Room temperature is a convenient level of operation and gives good results. Somewhat higher temperatures give slightly better yields. The process is ordinarily run at or near normal atmospheric pressure, but moderate superatmospheric pressure may be necessary at the higher temperatures. Process temperatures of 20–100° C. are preferred.

The concentration of the reaction solution is not a critical condition for the reaction. Good results are obtained at 0.05–2 molar concentrations of saligenin.

Preferred operation of the process comprises forming the reaction solution according to a particular sequence to avoid the formation of temporary precipitates which are sometimes slow to redissolve. A satisfactory sequence includes first dissolving the saligenin in the alkanoic solvent, then the manganese salt, the chelator, and finally the alkali. The solution is then contacted with oxygen or an oxygen-containing gas such as air, preferably until oxygen absorption is substantially complete. This can be done by any convenient method such as agitating the solution in contact with oxygen, bubbling oxygen through the solution, or by contacting the solution with oxygen in a countercurrent absorption column. The salicylaldehyde product can be separated from the oxidized solution by any conventional method, for example, acidifying the solution by addition of a non-oxidizing acid and steam distilling the salicylaldehyde from the resulting mixture. The salicylaldehyde can then be separated from the steam distillate and further purified if desired by known methods.

The process as described is also applicable to the preparation of salicylaldehydes which are substituted on the aromatic nucleus with one or more, and preferably not more than two, substituents such as halogen, lower alkyl, or lower alkoxy. For example, by this process salicylaldehydes such as 3-chlorosalicylaldehyde, 3-methoxysalicylaldehyde, 4-methylsalicylaldehyde, 3-tert-butyl-5-methylsalicylaldehyde, and 5,6-dimethylsalicylaldehyde are obtained by oxidation of the corresponding substituted saligenins. The terms salicylaldehyde and saligenin are, therefore, used generically in this application to describe not only the unsubstituted compounds, but also the substituted compounds as illustrated above.

The following examples illustrate the various conditions and reactants of the process.

These illustrative experiments were conducted by forming in a reaction vessel the desired solution of saligenin, manganese salt, chelating compound, and base in an alkanol solvent, connecting the reaction vessel to a closed system, and replacing the air in the system with cylinder oxygen under atmospheric or moderate superatmospheric pressure. The solution was then stirred magnetically at a predetermined temperature controlled by immersion of the vessel in a water bath and oxygen absorption was measured by the pressure drop within the system, more oxygen being supplied as necessary.

After oxygen absorption had substantially ceased, the reaction mixture was acidified with hydrochloric acid and steam distilled to remove the salicylaldehyde.

Unreacted saligenin was determined by buffering an aliquot of the reaction mixture to pH 7 and evaporating off the alkanol solvent. The residue was taken up in sodium bisulfite solution which was extracted with ether and the ether was evaporated from the extract to obtain the saligenin.

*Example 1–3*

Three homogeneous solutions of one liter volume were prepared by dissolving in 70% aqueous methanol, 0.1 g. mole of saligenin, 0.01 g. mole of $\alpha,\alpha'$-(ethylenediimino) di-o-cresol, 0.01 g. mole of manganous chloride, and 0.1 g. mole quantities of base as follows: (1) 4.0 g. of NaOH, (2) 10.6 g. of $Na_2CO_3$, and (3) a combination of 4.2 g. of $NaHCO_3$ and 5.3 g. of $Na_2CO_3$ respectively. These solutions were contacted with oxygen at 25° C. by the procedure described above until oxygen absorption had substantially stopped. The reaction mixtures were then analyzed for salicylaldehyde content. The results are summarized in the following table.

| Run No. | Hours for $O_2$ Absorption | Percent Yield [1] of Salicylaldehyde |
| --- | --- | --- |
| 1 | 0.5 | 72 |
| 2 | 2.5 | 50 |
| 3 | 2.5 | 26 |

[1] Based on the total saligenin originally present.

Runs made as above but using ts the base component of the mixture 0.1 g. mole of $NaHCO_3$ or 1.0 g. mole of NaOH respectively showed no reaction with oxygen. The effect of varying the molar ratio of NaOH to saligenin in the reaction mixture is shown in Examples 4–9.

*Examples 4–9*

Solutions of one liter volume were made up as above by dissolving 0.1 g. mole of saligenin, 0.01 g. mole of manganous chloride, 0.01 g. mole of $\alpha,\alpha'$-(ethylenediimino)di-o-cresol, and different quantities of sodium hydroxide in 80% aqueous methanol. These solutions were contacted with oxygen at 25° C. until absorption was substantially complete and the reaction mixtures were worked up and analyzed as previously described. The results are listed below.

| Run No. | Mole Ratio, NaOH/Saligenin | Percent Yield of Salicylaldehyde |
| --- | --- | --- |
| 4 | 0.8 | 65 |
| 5 | 1.0 | 75 |
| 6 | 1.2 | 75 |
| 7 | 1.4 | 78 |
| 8 | 2.0 | 80 |
| 9 | 5.0 | <10 |

The effect of solvent composition is shown in Examples 10–15. Best results are obtained with aqueous methanol when the methanol content is at least about 70% by volume. Pure methanol is satisfactory. Other lower alkanols give similar results.

*Examples 10–15*

Solutions were made up and reacted with oxygen as above using as the solvent methanol containing various proportions of water and also other aqueous lower alkanols. Quantities of reactants are given in gram moles. The chelator in each case was that used in the examples above. Manganous chloride, 0.01 g. mole in amount, was used in each run as the source of manganese.

| Run No. | Saligenin | Chelator | NaOH | Solvent | Percent Yield |
| --- | --- | --- | --- | --- | --- |
| 10 | 0.5 | 0.05 | 0.5 | 20% $CH_3OH$ | 0 |
| 11 | 0.5 | 0.05 | 0.5 | 50% $CH_3OH$ | 41 |
| 12 | 0.1 | 0.01 | 0.2 | 80% $CH_3OH$ | 80 |
| 13 | 0.1 | 0.01 | 0.2 | 100% $CH_3OH$ | 75 |
| 14 | 0.1 | 0.01 | 0.12 | 90% $C_2H_5OH$ | 78 |
| 15 | 0.1 | 0.01 | 0.12 | 90% $n-C_4H_9OH$ | 64 |

The concentration of the manganese chelate has an effect on the yield of salicylaldehyde. While there is an optimum range of volume concentration, this is not a critical factor in the process so long as a minimum concentration ratio of about 0.02 mole of manganese chelate is present per mole of saligenin. The effect is illustrated by Examples 16–19, which experiments were carried out at room temperature in 70–80% aqueous methanol using equal molar proportions of saligenin and sodium hydroxide and the manganese salt and chelator shown above. The results are calculated on the basis of 0.1 g. mole of starting saligenin.

| Run No. | Chelator, g. moles | $MnCl_2$, g. moles | Percent Yield Salicylaldehyde |
| --- | --- | --- | --- |
| 16 | 0.001 | 0.001 | <10 |
| 17 | 0.002 | 0.002 | 39 |
| 18 | 0.0033 | 0.003 | 53 |
| 19 | 0.01 | 0.01 | 72 |

Larger quantities of manganese chelate are also effective but confer no substantial advantage.

Examples 20–23 were run generally under the conditions shown above but at slightly higher temperatures. Chelators of closely similar structure were tested under these conditions and found to be active. The experiments were carried out in 80% aqueous methanolic solution using one mole of sodium hydroxide per mole of saligenin. Manganous chloride was used as the source of manganese in 0.01 g. mole quantity in each run.

*Examples 20–23*

| Run No. | Chelator, g. moles | Saligenin, g. moles | Temp., ° C. | Percent Yield of Salicylaldehyde |
| --- | --- | --- | --- | --- |
| 20 | 0.1 | 0.5 | 70–80 | 62 |
| 21 | 0.01 | 0.5 | 50 | 61 |
| 22 | 0.01 A | 0.1 | 70–80 | 71 |
| 23 | 0.01 B | 0.1 | 70–80 | 48 |

A = $\alpha,\alpha'$-iminobis(ethylenediimino)di-o-cresol.
B = $\alpha,\alpha'$-(ethylenedinitrilo)di-o-cresol.

Runs 20 and 21 were made using as the chelator $\alpha,\alpha'$-(ethylenediimino)di-o-cresol.

*Example 24*

To a solution of 0.005 g. mole of saligenin and 0.0005 g. mole of $\alpha,\alpha'$-(ethylenediimino)di-o-cresol in 35 ml. of methanol there is added 5 ml. of a 0.1 molar aqueous solution of $MnCl_2$. To the resulting solution there is added a slurry of 0.005 g. mole of $Ca(OH)_2$ in 10 ml. of water. This mixture is stirred in contact with an oxygen atmosphere at about 25° C. as described above until oxygen absorption has stopped. The reaction mixture is then acidified and steam distilled as shown in the above examples. A yield of about 55% of salicylaldehyde is obtained, based on the starting saligenin.

Similar results are obtained when the calcium hydroxide used in the above example is replaced by an equivalent quantity of another alkaline earth metal hydroxide of similar basicity, for example, strontium hydroxide or barium hydroxide.

Results similar to those shown in the above examples are obtained when a compound such as α,α'-iminobis(propylenediimino)do-o-cresol, α,α'-iminibis(ethylenedinitrilo)di-o-cresol, or α,α'-(propylenediimino)di-o-cresol is employed as the chelator in the process as described. Mixtures of such chelating agents are also effective.

However, compounds of somewhat similar structure and which are known to have some chelating properties are not operable in the present process. For example, triethylenetetramine, iminodiacetic acid, N,N'-bis(2-hydroxyethyl)glycine, and N,N'-ethylenebis(2-o-hydroxyphenylglycine) were all found to be inactive as chelators in this reaction.

I claim:
1. A process for making a salicylaldehyde which comprises forming a solution in an alkanolic solvent of a saligenin, about 0.5 to about 4 equivalent weights per mole of said saligenin of a strong base and an effective amount of the manganese chelate of a compound of the formula

$$A-(C_nH_{2n})(NHC_nH_{2n})_x-A$$

wherein $n$ is 2–3, $x$ is 0–2, and A is selected from the group consisting of

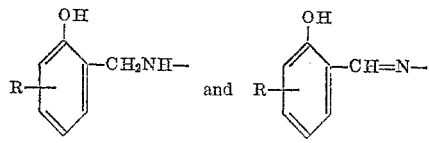

wherein R is selected from the group consisting of hydrogen and lower alkyl, said alkanolic solvent consisting essentially of an alkanol of 1–5 carbon atoms and zero to about 50% by volume of water based on the total volume of solvent, and contacting said solution with an oxygen-containing gas at 0–150° C. for a length of time sufficient for a significant quantity of said salicylaldehyde to be formed.

2. The process of claim 1 wherein the manganese chelate is that of α,α'-(ethylenediimino)di-o-cresol.

3. A process for making salicylaldehyde which comprises forming a solution in an alkanolic solvent of saligenin, about 0.5 to about 4 equivalent weights per mole of saligenin present of a strong base and an effective amount of the manganese chelate of α,α',-(ethylenediimino)di-so-cresol, said alkanolic solvent consisting essentially of an alkanol of 1–5 carbon atoms and zero to about 50% by volume of water based on the total volume of solvent, contacting said solution with an oxygen-containing gas at 0–150° C. for a length of time sufficient for a significant quantity of salicylaldehyde to be formed, and separating from the solution at least a portion of said salicylaldehyde.

4. The process of claim 3 wherein the alkanolic solvent consists of 70–100% by volume of methanol and 0–30% of water.

5. The process of claim 3 wherein the base is a strong alkali metal base.

No references cited.

LEON ZITVER, *Primary Examiner.*